United States Patent

Calundann

[15] 3,687,918
[45] Aug. 29, 1972

[54] ACRYLONITRILE POLYMERIZATION

[72] Inventor: Gordon W. Calundann, Newark, N.J. 07112

[73] Assignee: Celanese Corporation, New York, N.Y.

[22] Filed: June 16, 1969

[21] Appl. No.: 833,539

[52] U.S. Cl......260/85.5 ES, 260/29.6 AN, 260/78.5 N, 260/79.3 MU, 260/80.3 R, 260/85.5 ZA, 260/85.5 XA, 260/88.7 R, 260/88.7 D, 260/DIG. 28

[51] Int. Cl..............................C08f 3/76, C08f 15/38

[58] Field of Search........260/29.6 AN, 32.4, 79.3 M, 260/85.5 R, 85.5 N, 88.7 R, 88.7 F

[56] References Cited

UNITED STATES PATENTS

| | | | |
|---|---|---|---|
| 3,053,806 | 9/1962 | La Combe | 260/49 |
| 3,375,237 | 3/1968 | Baizer | 260/88.7 |
| 3,395,133 | 7/1968 | D'Alelio | 260/88.7 |
| 3,449,286 | 6/1969 | Szita | 260/30.4 |

Primary Examiner—Joseph L. Schofer
Assistant Examiner—C. A. Henderson, Jr.
Attorney—Thomas J. Morgan, Stephen D. Murphy and Louis Gubinsky

[57] ABSTRACT

A method of polymerizing acrylonitrile polymers at elevated temperatures and superatmospheric pressure conditions in a novel organic, preferably aqueous-organic, reaction medium in which the monomeric reactants and the polymerized acrylonitrile are soluble under the polymerization conditions. The polymerization conditions may correspond to or are conveniently changed to polymer shaping conditions utilizing the same solvent-reaction medium, thus eliminating polymer recovery, polymer washing, polymer dissolution and the like, process steps. The organic polymerization medium is a monomer and polymer solvating amount of acetonitrile, generally in an amount of 60 to 100 percent by weight of the solvent solution with the residual amount being preferably water. The process is particularly suitable for continuous reaction and polymer shaping wherein an effluent solution of polymer and organic or aqueous-organic reaction medium is continuously withdrawn from the reaction system, maintained under solubilizing conditions of heat and superatmospheric pressure, with suitable adjustment of solvent concentrations as desired to provide homogeneous polymer suitable for extrusion into a shaped article.

15 Claims, 1 Drawing Figure

PATENTED AUG 29 1972
3,687,918
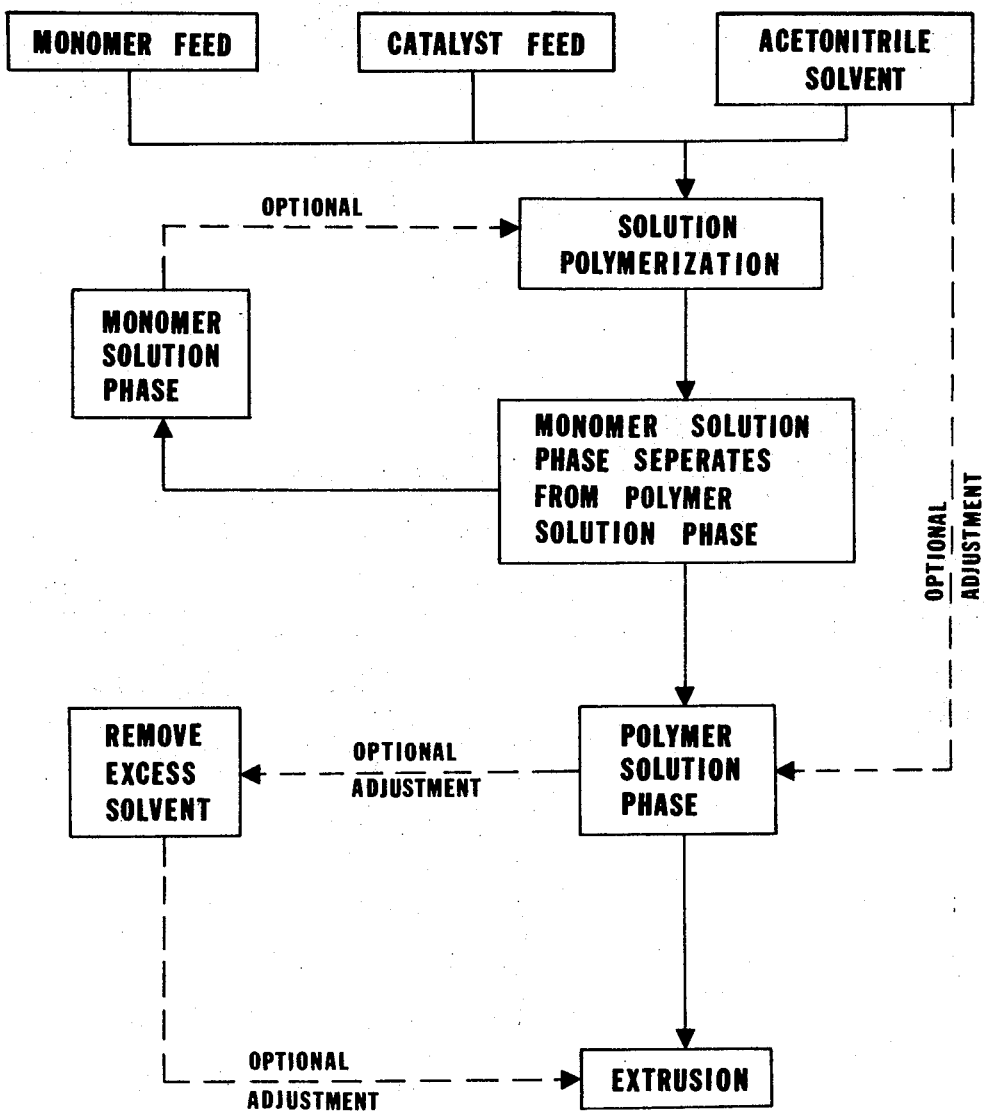
GORDON W. CALUNDANN
INVENTOR
BY Louis Gutinsky
ATTORNEY

ACRYLONITRILE POLYMERIZATION

BACKGROUND OF THE INVENTION

This invention relates to the preparation of acrylonitrile polymers in a novel reaction medium, which reaction medium, under the conditions of polymerization, is a solvent for the monomer reactants as well as for the polymer product. Under the polymerization conditions described hereinafter, the polymerization solvent can be made to serve as the solvent for the polymer, thus providing a homogeneous polymer solution particularly suitable for immediate extrusion into shaped articles.

Numerous methods have been described for the preparation of acrylonitrile polymers. Such polymerization reactions generally are either solution or suspension polymerizations. The present method is best classified as a solution polymerization, but it is unique in the solvent system utilized, particularly because the solvent under the polymerization conditions dissolves the resulting polymer forming a distinct polymer-solvent layer suitable for direct polymer shaping processes. Thus, by maintaining the polymerization conditions of temperature and pressure, the same solvent in proper concentration can be subsequently utilized as an extrusion medium, thereby making the present process particularly adapted for continuous polymerizations and extrusions of acrylonitrile polymers, copolymers, terpolymers and the like.

In commonly assigned copending application Ser. No. 833,538 filed June 16, 1969, by Antony E. Champ and Charles Malcolm Hendry, there is disclosed and claimed a process for producing an acrylonitrile polymer consisting essentially of polymerizing acrylonitrile monomer with at least one other ethylenically unsaturated monomer copolymerizable with acrylonitrile in a proportion to yield a polymer of at least 85 weight percent acrylonitrile and from about 0.1 up to 15 weight percent of said copolymerizable monomer in a solvent solution for said acrylonitrile monomer and said copolymerizable monomer in the presence of a polymerization catalyst, said solvent consisting essentially of a mixture of a lower alkyl nitrile having two to four carbon atoms and water, wherein the nitrile portion of the solvent equals about 10 to 90 percent by weight and the residual amount is water.

THE INVENTION

In accordance with the invention, a process is provided for producing an acrylonitrile polymer comprising continuously polymerizing acrylonitrile under superatmospheric pressure in a solvent solution for acrylonitrile monomer and polymer in the presence of a polymerization catalyst, said solvent comprising a monomer and polymer solvating amount of acetonitrile solvent, preferably a mixture of acetonitrile and water, wherein the acetonitrile portion of the solvent preferably equals about at least 60 to 90 percent by weight and any residual amount is water, at a temperature between about the atmospheric boiling point of the solvent and the degradation temperature of the resulting polymer, said temperature being preferably above the gel point of the resultant polymer fraction. In a preferred embodiment, the polymer solvent fraction is removed from the polymerization zone, the polymer-solids concentration adjusted to 30 to 70 percent polymer by weight with the remaining portion totaling 100 percent being solvent, said solvent portion comprising 2 to 40 percent by weight of water and 60 to 98 percent by weight acetonitrile, while maintaining said solution under at least autogeneous pressure and a temperature of 80° to 170° centigrade, thereby forming a homogeneous polymer solution suitable for spinning.

The present method is particularly applicable to high acrylonitrile polymers containing more than about 85 percent acrylonitrile. A particular advantage of the present method is the capability of utilizing a completely integrated polymerization and dope preparation system which eliminates previous requirements of drying the polymer or even affecting a change in the liquid medium which under disclosed conditions acts as a polymerization and extrusion solvent. A further distinct advantage resides in the utilization of a low-boiling, previously considered nonsolvent for high polyacrylics to serve as both the polymerization monomer solvent and subsequently as the polymer solvent. When used in extrusion processes such as in dry spinning fibers, extruding moldings, and the production of the like shaped articles, the low-boiling solvent is particularly advantageous in overcoming previous difficulties encountered with conventional high-boiling solvents which are not readily removed from the extruded article in dry spinning operations.

DETAILS OF THE INVENTION

The invention is more clearly described by reference to the drawing which is a flow sheet describing a preferred method of integrating the present process into a continuous polymerization dope preparation and extrusion system. According to this method, monomer is continuously fed to a solution polymerization reactor maintained under superatmospheric pressure along with acetonitrile or acetonitrile-water in the desired proportions, catalyst, initiator and the like feed materials. Polymerization is promoted by the catalyst system, pressure and the temperature of the reactants. As is normal for such reactions, the reaction rate is largely temperature dependent. Higher temperatures result in faster reaction rates. The temperature employed is above about the atmospheric boiling point of said solvent and below the degradation temperature of the resulting polymer and is also preferably above the gel point of the polymer-solvent fraction of the reaction system.

The monomers used are soluble in the acetonitrile solvent at the concentrations used, e.g., 20 to 60 percent by weight monomer, and the temperatures employed. As polymer is polymerized, it remains as a dissolved solid which due to the somewhat unique interrelation between the solvent and acrylonitrile polymer readily separates as a polymer containing phase which is removed continuously or periodically from the reaction medium.

The present solvent system has been found to exhibit a rather unusual character compared to conventional fiber spinning solvents. The acetonitrile solvent portion is apparently absorbed by the polymer to fluidize it rather than the polymer being dissolved in the solvent. This phenomena can be more readily observed in the higher ratios of solvent to polymer, that is, where the polymer is present in the solvent at less than about 35 percent solids. At given temperature and pressure conditions, once the polymer has become fluidized and has absorbed the maximum amount of solvent, a distinctly observable second liquid fraction of excess solvent containing unreacted monomer forms, which if desired, can also contain the catalyst. Thus, the fraction containing polymer may be conveniently recovered by continuous siphoning, decantation two phase separation procedures and the like. The polymer containing effluent may be directly used as an extrusion solution or where desired may be concentrated by solvent evaporation to a polymer solution of still higher solids level and then used as an extrusion solution.

Considering the continuous operation in greater detail, the primary polymerization vessel should be agitated to ensure maximum polymerization efficiencies, particularly where excess quantities of monomer and solvent are present. The reaction mass may be continuously bled into a secondary stationary reactor wherein the two distinct layers form. The polymer-containing fraction, following adjustment of solvent content where desired or required, i.e., removal of solvent or addition of solvent where maximum absorbable quantity is not present during polymerization, is suitable for polymer shaping such as by dry spinning procedures. Of course, unless re-dissolution of polymer is employed, all of the sequential steps from polymerization through shaped article forming are carried out under the elevated temperatures and superatmospheric pressures described. Returning to the secondary reaction vessel, the monomer-solvent fraction is optionally, but preferably, returned to the primary polymerization vessel. Where desired a batch operation involving a single polymerization vessel may be employed.

Referring more specifically to the details involved in the present invention, the process as described can be utilized with high acrylonitrile polymers containing at least about 85 percent or more acrylonitrile. Such polymers are well known in the art and normally are used in fiber production as copolymers, terpolymers and higher copolymerized products. Typically, varying amounts of other copolymerizable monomers are added to produce the co- and ter-polymers. Typically, ethylenically unsaturated monomers, such as methylacrylate, methyl methacrylate, vinyl acetate, vinylidene chloride, styrene, sulfonic acid materials, such as sodium methylallyl sulfonate, disodium allyl phosphate and the like can be used. With high acrylics, the amount of copolymerized monomer is up to about 15 percent, but more generally in the range of about 0.1 to 10 percent by weight. While sulfur-containing monomers are preferred to enhance the dyeability of the end polymer, other dye-enhancing compounds can be used such as those containing a phosphorous group or other dye enhancing group, as are well known in the art.

The monomer concentration is maintained in the reaction medium in about the molar proportions desired in the resulting polymer and at a level sufficient to promote a rapid and continuous polymerization thereof. The monomer amount is maintained at a level whereby the monomer is substantially in solution at the reaction temperature. Thus, the monomer concentration can vary from about 1 to 80 percent or more, but is generally in the range of about 30 to 60 percent by weight of the reaction medium.

The reaction medium is an acetonitrile solvent, preferably acetonitrile/water. It is usually most desirable to have the proportions of acetonitrile, and water where included, equal to about the proportions which are used in the homogeneous extrusion solution described hereinafter, thereby reducing or eliminating large liquid adjustments between the polymerization stage and the production of the homogeneous extrusion solution.

Although acetonitrile can be used alone, a cloudy dope may result in the absence of very high pressure and temperature reaction conditions, particularly with less than 5 percent by weight of comonomers based on total monomers present, or more preferably the acetonitrile is used in conjunction with a portion of water. The addition of water lowers the gel temperature of the polymer-containing fraction as well as lowering the initial solution temperature of the polymer. Further, acetonitrile-water solvent is preferred in many instances as a dry spinning medium and materially aids in maintaining solvation of varying polymer concentrations. Therefore, in the solvent portion, it is preferable to use up to about 40 weight percent of water based on the acetonitrile and more preferably about 10 to 35 percent water and most preferably about 18 to 27 percent water. The lowest solution viscosities and lowest temperatures for forming a polymer solution for a given solid are obtained with 18 to 27 percent water in the solvent portion. High acrylonitrile polymers generally will absorb up to about 70 percent by weight of such acetonitrile-water mixtures.

The boiling temperature of acetonitrile is about 82° centigrade and the azeotrope of 15 percent water boils at about 76° centigrade. To form the initial solution or homogeneous monomer mixture, temperatures in excess of the boiling temperature of acetonitrile are generally preferred, particularly for the more difficultly soluble high acrylonitrile polymers. Therefore, the process utilizes an applied pressure or the vapor pressure of the acetonitrile and/or water developed autogeneously in a sealed unit at the elevated temperature. The pressure used is preferably that required to maintain the solvent in primarily the liquid phase at the polymer solvating temperature. This pressure increases with temperature and is in an amount of about 30 to 40 pounds per square inch gauge at about 100° centigrade but varys with the proportion of water used. Thus, the polymerization step is preferably conducted in a pressure unit or sealed system to prevent the escape of the acetonitrile water vapors and/or monomers and to maintain the acetonitrile water and/or monomers in the liquid phase.

The polymerization temperature will vary with the proportions of acetonitrile and water, the particular acrylonitrile polymer reactants, the catalyst used, the desired reaction speed and the like within the range of generally about 80° C. up to about 170° C. After forming and separating the polymer, the temperature of the polymer composition can be reduced to the desired holding temperature, which can correspond to the spinning temperature or molding temperature. The homogeneous polymer composition gels on reducing the temperature below about 80° centigrade, again depending on the particular composition and proportions. Thus, the composition can be cooled and retained in a gelled state for storage or shipment and/or maintained in the temperature range of about 80° up to below the degradation temperature of the polymer. The resultant compositions are remarkably stable to prolonged heating. For instance, a 40 percent solids solution of a polymer with a 95 percent acrylonitrile composition in 78/22 acetonitrile/water shows practically no change in viscosity after 3 days at 100° centigrade. When the present composition is stored for instance at room temperatures, it is preferred to retain the composition in a sealed unit to reduce or eliminate the loss of solvent therefrom over a period of time.

The catalysts preferably used in the present invention are free radical generating catalysts. Irradiation can also be used to promote the polymerization if desired. However, conventional free radical generating catalysts such as organic and inorganic peroxides are particularly useful. In general, any suitable acrylic catalyst polymerization system can be used, particularly those soluble in the reaction mixture and preferentially soluble in monomer-solvent mixture. The particular catalyst selected should preferably be sufficiently active at the polymerization temperatures, e.g., above the boiling point of the acetonitrile-water reaction medium, e.g., about 80° to 170° centigrade, and more preferably in the range of 90° to 130° centigrade. In order to obtain a high productivity, a satisfactory molecular weight, and polymers of good color, temperatures of about 100° to 120° centigrade are most preferred. As noted above, peroxides are particularly suitable in such processes, particularly, alkyl and aryl peroxides. Such peroxides may be thermally decomposable, since the peroxides as well as their decomposition products are generally soluble in the reaction medium, and are often most desirable for the sake of easier control, less temperature sensitivity and better color. As examples of suitable organic peroxide catalysts, there may be mentioned hydroperoxides such as cumene hydroperoxide, ketone peroxides such as methyl ethyl ketone peroxide, aryl peroxides such as lauryl peroxide and peroxy esters such as mono-tertiary butyl peroxy benzoate.

Redox catalyst systems in which both catalyst components are soluble in the reaction medium may also be employed with the present invention. As the oxidizing component of the redox system, there may be used one of the aforementioned peroxide catalysts, with the reducing component being selected for example, from the various organic sulfinic acids such as p-toulenesulfinic acid. Additional catalysts and catalytic systems operable herein will be obvious to those skilled in the polymerizing art, e.g., AZO solvent soluble catalysts.

In addition to the salts used as Redox catalysts, suitable neutral salts, such as alkali metal sulphates and phosphates, may be present in the polymerization mixture. If desired, polymerization regulators such as aliphatic mercaptans, optionally those containing a hydroxyl group near the sulphydryl group, for example thioglycol, may also be used in the process according to the invention.

In general, the polymerization is conducted under an atmosphere of inert gas, such as nitrogen or $CO_2$, and such may be employed to supply the superatmospheric pressures, although autogeneous derived pressure is normally preferred.

For fiber end uses of the polymer, which is most often preferred, the polymerization is effected to obtain an inherent viscosity (I.V.) of about 0.3 to 2.5 and more preferably at least about 0.5 and most preferably, 1.2 to 1.8 as measured in a 0.1 percent solution of polymer in N,N'dimethylformamide. Of course, higher I.V.'s can be used, but normally they result in excessive viscosities and no particular improvement in fiber properties. Where higher I.V.'s are desired, the aforementioned higher concentrations of water are usually preferred in the reaction medium.

Polymerization effluent, following removal of the monomer fraction where required, is suitable for spinning or is formed into a homogeneous extrusion solution by adjusting the solids content to the desired range, which can be 20 to 70 percent solids by weight. Because of the unusual solubility characteristics of the acetonitrile-water mixture, when high acrylonitrile polymer is used, a higher solids level is used, such as above about 30 percent, to obtain a homogeneous one-phase solution. As previously stated, this unusual phenomenon is believed to be a result of the solvent solution being absorbed into the polymer rather than the polymer being dissolved in the solvent under the polymerization conditions described herein. Thus, for high acrylics, solid contents above about 35 percent up to about 70 percent are the most preferred. For a typical fiber spinning operation, a polymer solids content of about 40 percent has been found to be particularly desirable.

With the polymer solids level selected for the particular extrusion process contemplated, the acetonitrile-water composition and concentration thereof for extrusion is selected depending on the end use of the dope solution and the desired viscosity at the extrusion temperature, the inherent viscosity of the polymer, the polymer composition and the like considerations. The water apparently acts with the acetonitrile to lower the solubility temperature and also effects the viscosity of the resulting solution. Therefore, it is desirable that a certain portion of the solvent system be water. Depending upon the particular polymer used, the proportion of water in the acetonitrile/water solvent system is preferably about 10 to 40 percent water, more preferably about 18 to 27 percent water with the remaining amount being acetonitrile. If desired, small additions of other solvents can also be used, but normally they are not needed.

Because the acetonitrile/water system is not a solvent for high acrylics under ambient temperatures and pressures, the homogeneous dope solution is prepared by maintaining the mixture under superatmospheric pressure along with heating to above the boiling point of the acetonitrile and more preferably above the azeotropic boiling point of acetonitrile and water. Typically, the pressure required is at least the autogeneous pressure developed by the solvent system, thereby maintaining the solvent system in the liquid phase. While the autogeneous pressure is sufficient, it is often convenient to increase the pressure up to about 100 pounds per square inch gauge or more above the autogeneous pressure as may be particularly desired in the particular extrusion system utilized. In the same manner, the heat utilized is normally dependent upon a particular polymer and the ease of solubility thereof, the proportions of water and acetonitrile which tend to dictate solubilizing temperature and the like considerations.

Thus, the polymer solution is best maintained at a temperature in the range of about 100° to 150° centigrade and more preferably in the range of about 110° to 130° centigrade to effect the homogeneous solutioning thereof.

Temperature and pressure are maintained to retain the solution in a liquid state. The release of pressure results in the rapid evaporation of the solvent and the consequent rapid solidification of the polymer. In the same manner, the lowering of the temperature drops the polymer below its solubility temperature, thereby also solidifying the polymer. Therefore, it is most convenient to pass the homogeneous dope solution directly to an extrusion process wherein shaped articles are made of the acrylic polymer. If desired, the prepared solution can be cooled and solidified and subsequently reheated under pressure to again liquify the dope.

The invention will be more fully described by reference to the following example, which illustrates certain embodiments of the present invention. Unless otherwise indicated, all temperatures are in degrees centigrade and all parts are by weight in the example and appended claims.

EXAMPLE

The process of the present invention is operated in accordance with the drawing to produce a high acrylic polymer comprised of about 93 percent acrylonitrile, 1 percent sodium methallyl sulfonate and 6 percent methylacrylate. The reaction is initiated by charging a closed reactor having agitation means therein with approximately 6 parts of methyl acrylate, 110 parts of acrylonitrile, 2 parts sodium methallyl sulfonate and 120 parts of acetonitrile/water mixture comprising 78/22 weight by weight acetonitrile/water. The reaction temperature is brought up to about 110° centigrade. Continuous reaction can be achieved by maintaining a monomer feed in the noted proportions with about a 2 hour residence time. A di-t-butylperoxide catalyst, 4 percent based on monomer, is used.

Following a 2 hour residence time, the cloudy reaction mixture is allowed to settle into two liquid phases, a clear, lower dope layer and an upper solvent layer containing unreacted monomer. The polymer dissolved in the lower layer has an I.V. of about 0.5 and sample determination indicates about 50 to 60 percent conversion of monomer. The reaction mixture is resolved and the resulting polymer-containing solution fraction could be cooled to as low as about 80° centigrade without solidifying the solution provided at least autogeneous pressure is maintained. However, it is preferred to maintain a temperature of about 100° to 130° centigrade and convey the homogeneous fluid solution directly to the extrusion process.

In the extrusion process, the release of the superatmospheric pressure as the polymer solution is extruded results in the rapid evaporation of the solvent and the solidification of the polymer. In the same manner, the dropping of the temperature below the solubility point, e.g., below about 80° centigrade, also results in the solidification of the polymer.

In the same manner, greater and lesser amounts of water as described herein are utilized in the solvent system to achieve correspondingly good results. Changes in the water concentration change the initial monomer and polymer solubility temperatures and the subsequent solidification temperature of the polymer.

While the invention has been described with reference to the preferred acetonitrile solvent because of its high volatility at comparatively low temperatures coupled with excellent solvating power for high acrylics under the conditions disclosed herein, other lower alkyl, particularly n-lower alkyl, nitriles containing three to four carbon atoms may be employed where desired. However, in such instance, higher temperatures and/or pressures are required for solvation and the advantage of high solvent volatility at dry spinning temperatures is somewhat lessened. Thus, within the concept of the invention, propionitrile, butyronitrile and isobutyronitrile, for example, are contemplated.

While the invention has been described in its most preferred embodiments, various modifications will become immediately apparent to those skilled in the art, particularly those suggested herein. Therefore, it is intended to cover the invention broadly, being limited only the the appended claims.

What is claimed is:

1. a process for producing an acrylonitrile polymer comprising polymerizing acrylonitrile monomer with at least one other ethylenically unsaturated copolymerizable monomer with acrylonitrile in a proportion to yield a polymer of at least 85 weight percent acrylonitrile and from about 0.1 up to 15 weight percent of said copolymerizable monomer in lower alkyl nitrile solvent wherein the nitrile compound contains two to four carbon atoms under superatmospheric pressure in the presence of a polymerization catalyst at a temperature at least about the atmospheric boiling point of said solvent, said acrylonitrile monomer and said copolymerizable monomer being soluble in said solvent under said superatmospheric pressure, and said temperature being above the gel point of the resultant polymer-solvent mixture, recovering said produced polymer and using the amount of solvent in excess of the amount absorbable by the produced polymer to form a monomer-solvent fraction and a polymer-solvent fraction, and removing the polymer-solvent fraction from the polymerization zone while being maintained under superatmospheric pressure and temperature above its gel point to form a homogeneous single phase polymer solution.

2. The process of claim 1 wherein said lower-alkyl-nitrile is acetonitrile.

3. The process of claim 2 wherein the acetonitrile solvent contains up to about 40 weight percent of water.

4. The process of claim 2 wherein the solvent comprises an acetonitrile/water mixture of 60/40 to 98/2 percent by weight acetonitrile/water, respectively.

5. The process of claim 2 wherein the polymerization reaction residence time and temperature employed are sufficient to produce an acrylonitrile polymer having an inherent viscosity of at least about 0.4.

6. The method of claim 2 wherein the superatmospheric pressure is sufficient to substantially retain the polymerization system in the liquid phase.

7. The method of claim 6 wherein the superatmospheric pressure is about equal to the vapor pressure produced by the polymerization system.

8. The method of claim 6 wherein the superatmospheric pressure is produced autogeneously by heating the mixture in a sealed system.

9. The process of claim 1 wherein the acrylonitrile polymer is a fiber-forming polymer and the homogeneous polymer solution is spun into a fiber.

10. The process of claim 9 wherein the polymerization, solvation and spinning into a fiber is operated as a continuous integrated process.

11. The process of claim 1 wherein the copolymerizable monomer is methyl acrylate.

12. The process of claim 2 wherein the acrylonitrile monomer is copolymerized with another ethylenically unsaturated sulfonic group containing monomer in an amount of 0.1 to 5 weight percent of the polymer.

13. The process of claim 9 wherein said solution is dry spun into a fiber.

14. The method of claim 2 wherein the temperature is about 80° to 170° C.

15. The method of claim 4 wherein said acetonitrile/water solvent contains about 18 to 27 percent water.

* * * * *